Oct. 21, 1958 A. H. FAULKNER 2,857,470

TRANSISTOR LINE IDENTIFIER

Filed May 2, 1956 2 Sheets-Sheet 1

INVENTOR.
ALFRED H. FAULKNER
BY Wm. Walter Owen,
ATTY.

Oct. 21, 1958 A. H. FAULKNER 2,857,470

TRANSISTOR LINE IDENTIFIER

Filed May 2, 1956 2 Sheets-Sheet 2

INVENTOR.
ALFRED H. FAULKNER
BY Wm. Walter Owen.
ATTY.

United States Patent Office 2,857,470

Patented Oct. 21, 1958

2,857,470

TRANSISTOR LINE IDENTIFIER

Alfred H. Faulkner, Chicago, Ill., assignor to General Telephone Laboratories, Incorporated, a corporation of Delaware Application May 2, 1956, Serial No. 582,202

17 Claims. (Cl. 179—18)

Figure 1:
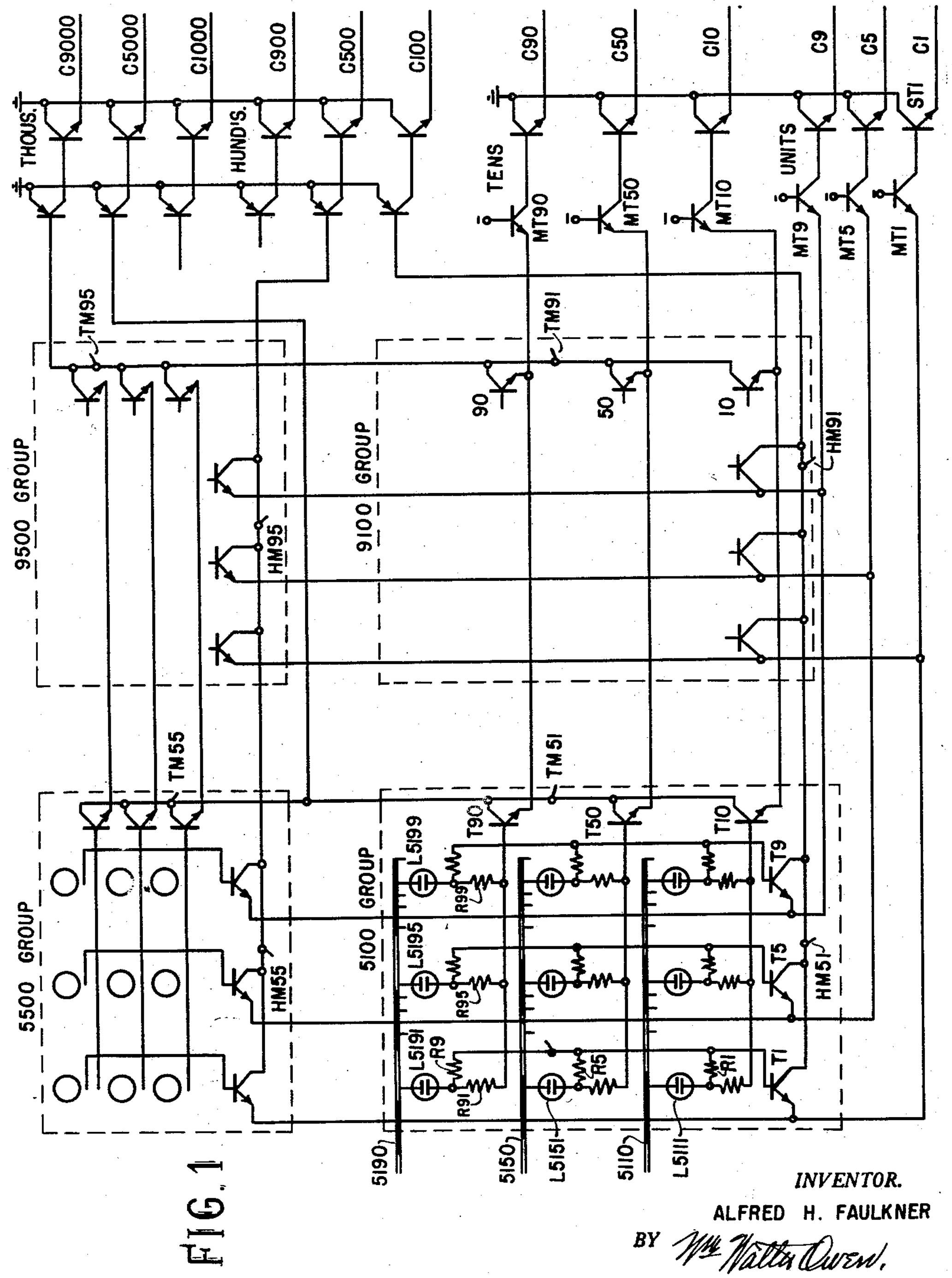

This invention relates to telephone systems and more particularly to those systems in which it is required that the subscriber's line initiating a call be identified and registered.

The type of system to which my invention will apply is of the type disclosed by the Ostline Patent No. 2,639,330 for a standard exchange of 10,000 lines. The circuit of the cited patent shows a system in which there is a neon lamp individual to each line in the exchange. Upon notice of a calling line to be identified, the lamp associated with the calling line is rendered conductive, completing a circuit to a sensitive relay indicating the hundred line group to which the calling line belongs. The sensitive relay further actuates group and marking relays to single out the tens and units digits of the calling line and register the entire four digit representation.

In the present invention as in the cited patent, a neon lamp individual to the subscriber's line is rendered conductive on notice that that particular line is to be identified and registered as the calling line. In the present circuit, conduction of the lamp transmits an indication to a pair of transistors in the hundred group of the calling line. The transistors so marked serve to indicate the final two digits associated with the calling subscriber line. From these two indications, further notice is sent to other transistors to mark the thousands, hundreds, tens and units digits of the calling line. These indications are transmitted to a register the function of which is well-known.

An object of the invention is to provide a simple line detection and identification system which originates its thousands and hundreds indications at the same transistors at which the tens and units indications are originated.

Another object of the invention is to provide a transistor matrix system which, through the use of the inherent transistor characteristics, prevents false indications due to feedback within the matrix.

A further object of the invention is to provide a relayless detection system which requires but little power to operate and maintain, thus operating in a small fraction of the operate time of an analogous relay system.

The present circuit requires, as does the cited circuit, one neon lamp per line in the exchange. The lamps are arranged in one hundred line groups and each hundred group is arranged in a square matrix, called the lamp matrix. For each one hundred line lamp matrix there are provided twenty group indicating transistors, ten to indicate the respective tens digits and the other ten to mark the respective units digits. Also provided are common marking transistors to supply the marking for the respective digits. For this purpose ten marking transistors are needed in each of the four ranks of digits required in a ten thousand line exchange.

The emitters of the units digits indicating transistors are individually connected to the emitters of the units indicating transistors within all other hundreds groups marking the same units digit. These multiple connections are then further connected to the units marking transistor individual to that particular digit. In a similar manner, the emitters of the tens group indicating transistors are individually multipled to all the other emitters of tens transistors serving that particular tens digit and finally connected to the tens marking transistor for that digit. In this way, each line lamp in the exchange has a single appearance at a units marking transistor and at a tens marking transistor corresponding respectively to the units and tens digits of the line and its line lamp.

For indicating the hundreds and thousands digits, each hundreds group may be considered as an individual in a square matrix, called the group matrix. Within each hundreds group, the collectors of the units indicating transistors are directly multipled. Also, the collectors of the tens indicating transistors are directly multipled. In this manner, each hundred group has a single units collector connection and a single tens collector connection. The common units connection is used to mark the hundreds rank within the group matrix, while the tens common is used to represent the thousands rank within this matrix. For this purpose, twenty marking transistors are provided, ten for the columns or thousands digit and ten for the rows or hundred digit so that each common collector connection is then connected to mark its conduction on a single marking transistor in the thousands rank of digits and on a single marking transistor in the hundreds rank. As a result each line lamp on conduction marks a single marking transistor in each of the four ranks of digits; the four digit representation thus secured being the directory number of the line associated with the conducting lamp.

Within the lamp matrix, false indications due to internal feedback are prevented by a pair of resistors connected in parallel to each line lamp, one resistor in each of the paths to a group transistor. When a lamp conducts, there is therefore but a single resistance in its path to the proper transistor and three resistances in its path to all remaining transistors. The voltage drop across three resistors is great enough so that no effect on transistors other than the proper ones is generated.

In the group matrix, false indications are prevented by the inherent transistor characteristics. When a voltage differential is applied to an indicating transistor to cause it to conduct, the proper transistor will receive its conducting bias in the forward or low resistance direction and hence will conduct. The current flow through the conducting transistor to all the remaining transistors of the same rank will be in the reverse or high resistance direction effectively blocking the remaining transistors from the applied potential by this rectifier action.

For purposes of simplicity throughout this disclosure, it has been assumed that the four digit identification number for a calling line is the directory number of the particular subscriber's line. While this situation need not be true and very often is not true in the more complex systems, no worthwhile purpose would be served in attempting to illustrate the present invention using any other numbering scheme. To convert the numbering scheme to any other system would require but a change in the line to lamp connection, the location of the lamp in the double matrix system then determining the identification number.

Also, although the invention is mainly drawn as referring to telephone systems, it can readily be seen and appreciated that a circuit such as the present one, could find wide usage in allied fields such as computers, counters, etc. In fact wherever numerical indications are required to note and register the results of scanning or counting operations, my invention could find ready usage.

Figure 3:
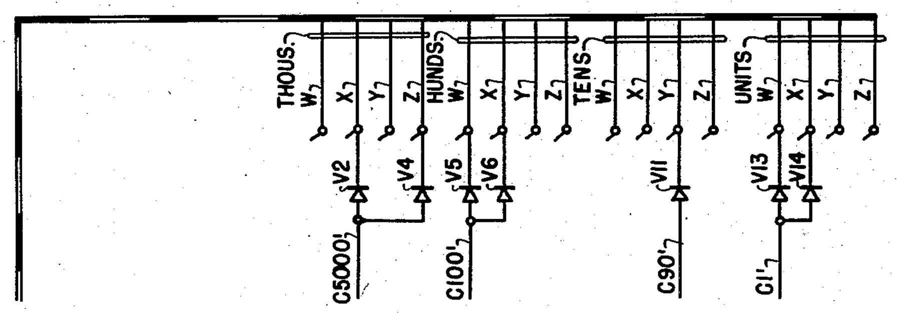
Figure 2:
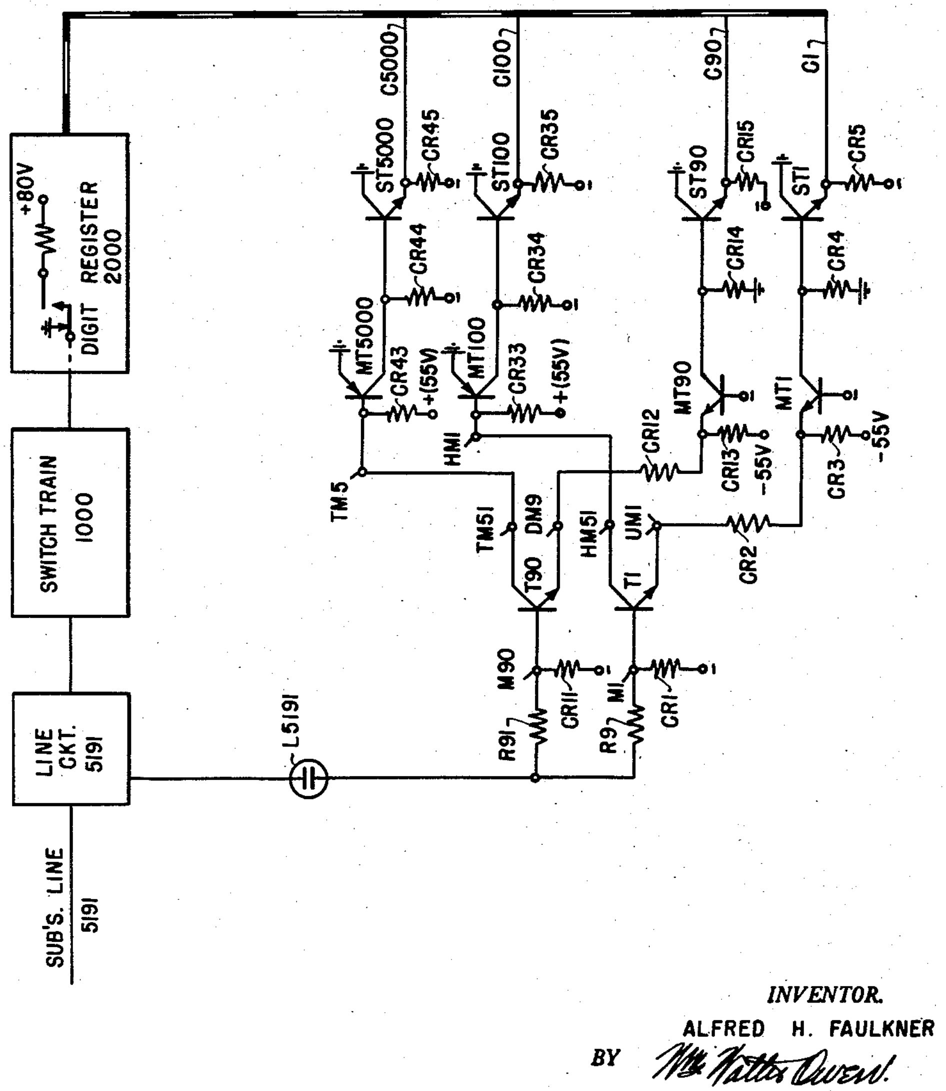

The specific features of the invention will more readily be understood when viewed in conjunction with the drawings. Fig. 1 is a schematic drawing showing the basic interconnections of the lamp and group matrices necessary to provide an identification of any line in the exchange. Fig. 2 is a more detailed drawing showing the path to be followed in detecting and identifying one specific calling line. The identification produced by Fig. 2 as shown would be in the straight decimal notation. Fig. 3 shows a diode register which could be connected to the output of Fig. 2 to provide an identification in the binary-decimal notation, if required by the register system used.

Fig. 1 shows a representative four of the hundred line groups in the exchange. Shown are components of the 5100, 5500, 9100, and 9500 groups with special emphasis on the 5100 group. It is believed that the basic plan of the disclosure can best be understood with the few groups shown, the remaining groups and interconnections being merely duplications of the representative section shown.

In the 5100 group are shown the first, fifth and ninth vertical columns and horizontal rows of a lamp matrix with their corresponding transistors. For example, the lower electrode of neon lamp L5191 is connected through resistor R9 to a multiple connection, joining together with the lamp L5151, through its resistor R5, and lamp L5111 through its resistor R1. The multiple connection point is further connected to the base of transistor T1. Thus, transistor T1 is connected through a resistor to each of the lamps in the first vertical column, all of which lamps have as their final identification digit 1. Transistor T5 is connected to all lamps in the fifth column and transistor T9 those in the ninth column.

Also connected to the lower electrode of lamp L5191 is the resistor R91 which is connected to a multiple connection to which lamps L5195 and L5199 are individually connected through their respective resistors R95 and R99. This multiple is connected to the base of transistor T90 to serve the lamps in the ninth horizontal row, all of which lamps have as their identifying tens digit the number 9. Similarly, the remaining rows are connected to their respective tens transistor.

In a like manner within each hundreds group, each lamp is represented by a vertical column transistor which is common to all lamps within the hundred group having the same units digit and also by a horizontal row transistor common to all lamps in the hundreds group having a common tens digit. Thus, a series of ten by ten lamp matrices are formed using twenty group transistors in each of the hundreds groups.

To forward the units and tens digits to the marking transistors, the following connections are necessary: the emitter of transistor T1 is connected to a multiple point to which is connected also the emitter of the first vertical column transistor from each hundred group. This connection is further connected to the emitter of units marking transistor MT1. In this manner transistor MT1 is connected through the first column transistors of each hundred group to each lamp in the exchange whose units identification digit is 1. Similarly, MT5 and MT9 are connected respectively to the fifth and ninth column transistors of all hundreds groups in the exchange.

The emitter of transistor T90 is multipled to all the ninth row transistors in the exchange at a multiple point to which is also connected the emitter of the tens marking transistor MT90. Similarly, transistor MT50 is connected to all the fifth row group transistors and transistor MT10 to all the first row transistors.

To indicate the hundreds and thousands digit the following plan is used. Within each hundreds group, the collectors of all the columns transistors are commonly connected. As an example, in the 5100 group the collectors of transistors T1, T5 and T9 are multipled at a connection point HM51. Also, within each hundreds group the collectors of the rows transistors are multipled together, as is shown with the collectors of transistors T10, T50 and T90 which are connected at multiple point TM51. In the 5500 group units connection HM55 and tens connection TM55 are made to represent their respective multiples; HM91 and TM91 thus representing the 9100 group and HM95 and TM95 representing the 9500 group.

At this stage, we may consider for the purpose of the thousands and hundreds marking that each hundreds group is an individual, having a single column or units connection and a single row or tens connection. Shown in Fig. 1 are four of the individuals of the group matrix namely those in the first and fifth rows and fifth and ninth columns. The first row is made by multipling connection points such as HM51 and HM91 to the base of marking transistor MT100. Transistor MT100 is thereby connected to the multiple from each of the hundreds group having as their characteristic the hundreds digit 1. The fifth row is interconnected by the multipling of points HM55 and HM95 to the base of transistor MT500. In this manner each row of the group matrix is represented by a separate marking transistor for its hundreds digit.

The thousands digits are represented by the columns of the group matrix. These columns are formed by the interconnection of the commoned points such as TM51 and TM55 at the base of the thousands marking transistor MT5000. Transistor MT5000 is connected through the transistor chain to all lamps whose thousands digit is 5. Similarly the ninth column is formed by the interconnection of points TM91 and TM95 at the base of the marking transistor MT9000. The remainder of the matrix is, of course, filled out in the same manner.

Each of the marking transistors has connected directly to it, a slave transistor which permits the operation of relays or other low resistance load circuits from the identification output circuits obtained at the marking transistors output. As an example, the base of slave transistor ST1 is connected directly to the collector of its appropriate marking relay MT1. Connected to the emitter of transistor ST1 is the output lead C1 which returns the information that the identified units digit is the number 1. For output of the circuit in decimal notation, forty output leads are required, each lead directly connected to a slave transistor which in turn is individual to a marking transistor.

In summary, each line lamp is therefore connected ultimately to a marking and slave transistor in each of the four ranks of digits to properly identify the four digit representation associated with the line lamp.

When the circuit of Fig. 2 is at normal, with no calling line being identified, transistors MT1 and MT90 are biased conductive. This necessitates that all tens and units marking transistors be normally maintained conductive. The remainder of the transistors are normally maintained inactive. When a subscriber line 5191 initiates a call, line circuit 5191, switch train 1000 and digit register 2000 are seized. In the register 2000, notice is given of a calling line to be detected and identified. Upon receipt of this notice a relay in the register operates its contacts 80. A +80 volt booster battery is sent back from contacts 80 of register 2000, through switch train 1000 and line circuit 5191 to the associated neon lamp L5191. Lamp L5191 will then conduct, increasing the voltage at the base of transistors T1 and T90.

Normally under the influence of the negative battery through resistor CR1 and connection point M1, the base of transistor T1 is maintained at essentially negative battery voltage of —48 volts. With the conduction of lamp L5191, the voltage increase previously mentioned, is transmitted through resistor R9 and multiple connection M1 to be impressed on the base of transistor T1. Transistor T1 will thereupon conduct. Thereafter, a current path is established as follows: ground, emitter-base of transistor MT100, connection HM1, connection HM51, collector-emitter of transistor T1, connection UM1, resistors CR2 and CR3 to the negative bias source of —55 volts. In this manner, transistor MT100 is rendered conductive.

On conduction of transistor MT100, increased current flows from ground through the emitter-collector of MT100 and resistor CR34 to negative battery. The voltage at the collector of transistor MT100 is raised from essentially negative battery potential to ground potential. In this way, the voltage at the base of transistor ST100 is raised to its conduction level. On conduction, increased current flows from ground through the collector-emitter of transistor ST100 and resistor CR35 to negative battery. The emitter voltage level of transistor ST100 is thereby increased, such that a signal is transmitted on conductor C100 to the register 2000 that the hundreds digit of the calling line is the number 1.

Also, upon conduction of transistor T1, the voltage at the emitter of transistor MT1 is raised to a level that will cause transistor MT1 to be cut off. With transistor MT1 cut off, its collector voltage rises from essentially negative battery to ground potential. This voltage increase is impressed from ground through resistor CR4 on the base of transistor ST1 causing transistor ST1 to conduct. On conduction, increased current from ground through the collector-emitter of ST1 to resistor CR5 and negative battery raises the voltage level of conductor C1 so that a signal is sent to the register that the units digit of the calling line being identified is the number 1.

At the same time the conduction of lamp L5191 is causing transistor T1 to conduct, an identical action is taking place in the circuit of transistor T90. The voltage increase through lamp L5191 is transmitted through resistor R91 and connection point M90 to the base of transistor T90, thus raising the voltage level from negative battery induced through resistor CR11 and connection point M90. Transistor T90 then conducts. Increased current is stimulated in the collector-emitter circuit of transistor T90. Transistor MT5000 is caused to conduct and transistor MT90 is cut-off. On conduction of transistor MT5000, transistor ST5000 is raised to its conduction level, sending notice out on conductor C5000 that the thousands digit of the detected calling line is the number 5. Also on cut-off of transistor MT90, transistor ST90 is raised to the conduction level transmitting the indication on lead C90 that the tens digit of the calling line is the number 9. In this manner the calling line has been fully identified as the line having the number 5191.

It should be noted that the bias source shown as either the —55 volts or + is used to maintain a voltage differential from the negative battery and thus maintain transistors MT100 and MT5000 cut-off at normal and maintain transistors MT1 and MT90 conductive.

Fig. 3 shows the diode network necessary to convert the output designations of Fig. 2 from the decimal indication shown into the binary-decimal notation. The most common binary-decimal system used in Automatic Toll Ticketing is the WXYZ code which is the one used in Fig. 3.

The code and the digit conversion is as follows:

| | |
|---|---|
| 1 | WX |
| 2 | WY |
| 3 | WZ |
| 4 | XY |
| 5 | XZ |
| 6 | YZ |
| 7 | W |
| 8 | X |
| 9 | Y |
| 0 | Z |

When a WXYZ code output is required by the register, lead C1′ is connected to the output of slave transistor ST1 of Fig. 2. Connected to this lead are the varistors V13 and V14 which are respectively connected to the W and X units leads to mark the units digit as 1. Similarly the C90′ lead is connected to the emitter of slave transistor ST90 and varistor V11 and the Y lead to mark the tens digit of the calling line as the digit 9. Lead C100′ is connected to transistor ST100 and through varistors V5 and V6 to the W and X hundreds leads to mark the hundreds digit of the calling line as 1. Also lead C5000′ is connected to varistors V2 and V4 and the X and Z thousands leads to mark that digit as 5.

For each of the four ranks of digits at the W, X, Y and Z leads, there are multipled the requisite varistors to supply the ten possible digits of the rank to the four output leads of that rank. The use of varistors, as unidirectional resistors in this type of instance is well-known, its inclusion here is to show one of the possible variations allowable within the scope of the present invention.

What is claimed is:

1. A line identification circuit for a telephone system having a subscriber line identified by a multi-digit designation, comprising a single gas-filled electronic device individual to said line, means controlled over said line responsive to a call initiated thereover for rendering said gas-filled device conductive, a plural digit register comprising a plurality of group transistors, one of said group transistors associated with the final digit and third last of the multi-digit representation of the calling line, another of said group transistors associated with the second last digit and also the fourth last digit of said multi-digit representation, said two group transistors rendered effective upon conduction of said electronic device, thereby identifying all the digits of the multi-digit designation of said initiating line.

2. A line identification circuit for a telephone system having a subscriber line identified by a multi-digit designation, comprising a single gas-filled electronic device individual to said line, means controlled over said line responsive to a call initiated thereover for rendering said gas-filled device conductive, a plural digit register comprising a plurality of group transistors and marking transistors, all said transistors having a plurality of elements, the first element of a first and a second of said group transistors connected to said electronic device, both said group transistors rendered conductive upon conduction of said electronic device, a second element of said first group transistor connected to a first of said marking transistors, a second element of said second group transistor connected to a second of said marking transistors, a third element of said first group transistor connected to a third of said marking transistors, a third element of said second group transistors connected to a fourth of said marking transistors, said second and third elements of both said group transistors rendered effective upon conduction of said group transistors thereby changing the condition of said four marking transistors and causing said four marking transistors to register four digits of said multi-digit designation of the initiating line.

3. A line identifictaion circuit for a telephone system having a subscriber line identified by a multi-digit designation, comprising a single gas-filled electronic device individual to said line, means controlled over said line responsive to a call initiated thereover for rendering said gas-filled device conductive, a plural digit register comprising a plurality of group and marking transistors, each of said transistors having an emitter, a collector and a base, the base of a first and a second of said group transistors connected to said electronic device, conduction of said electronic device causing a voltage increase to be impressed on the base of both said group transistors, thereby rendering both said group transistors conductive, a first and a second of said marking transistors normally maintained conductive, the emitter of each of said normally conductive marking transistors connected individually to the emitter of said first and second group transistors, the collectors of said first and second group transistors connected respectively to the base of a third and fourth marking transistor, conduction of said first and second group transistors causing a circuit to be completed from the collector-emitter circuits of said first and second group transistors, thereby rendering said first and second marking transistors non-conductive and rendering said third and fourth marking transistors conductive.

4. A line identification circuit for a telephone system having a subscriber line identified by a multi-digit designation, comprising a single gas-filled electronic device individual to said line, means controlled over said line responsive to a call initiated thereover for rendering said gas-filled device conductive, a plural digit register comprising a plurality of group and marking transistors, each of said transistors having an emitter, a collector and a base, the base of a first and a second of said group transistors connected to said electronic device, conduction of said electronic device causing a voltage increase to be impressed on the base of both said group transistors, thereby rendering both said group transistors conductive, a first and second of said marking transistors normally maintained conductive, the emitter of each of said normally conductive marking transistors connected respectively to the emitter of said first and second of said group transistors, the collectors of said first and second group transitors connected individually to the base of a third and fourth marking transistor respectively, conduction of said first and second group transistors causing a circuit to be completed from the collector-emitter circuit of said first and second group transistors, thereby rendering said first and second marking transistors non-conductive and rendering said third and fourth marking transistors conductive, a plurality of slave transistors, each of said slave transistors directly connected to one of said marking transistors, said first and second marking transistors upon being rendered non-conductive causing the slave transistors connected thereto to be rendered effective to register the final and next final digits of said multi-digit designation of said calling line, conduction of said third and fourth marking transistors causing the slave transistors connected thereto to be rendered effective to register the third final and fourth final digits of the multi-digit designation of said calling line.

5. In a telephone system having a plurality of lines, each of said lines having a multi-digit identifying number individual thereto, means for registering digits individual to a line comprising a simple gas-filled lamp individual to each line, said lines arranged in groups of one hundred, the lamps individual to the one hundred lines in each group arranged in a square matrix having ten rows of lamps and ten columns of lamps, means commonly connecting the lamps of each column, a transistor individual to each said column of lamps, means commonly connecting the lamps of each row, a transistor individual to each of said rows, means for rendering one of said lamps conductive, conduction of said lamp causing the column transistor and the row transistor to which said conductive lamp is connected to become conductive thereby marking a portion of the digits of the identifying number of one of said lines.

6. In a telephone system including a plurality of lines, each of said lines having a multi-digit identifying number individual thereto, a single gas-filled lamp individual to each line, said lines arranged in groups of one hundred lines each, the lamps individual to the one hundred lines in each group arranged in a square matrix having ten rows of lamps and ten columns of lamps, means commonly connecting the lamps of each column, a transistor individual to each of said columns of lamps, each of said columns having a digit individual thereto, said column digit being the final digit of the multi-digit identifying number of the lines associated with the lamps in said column, means commonly connecting the lamps of each row to a transistor, each row having a digit individual thereto, said digit being the next final digit of said identifying number of the lines associated with the lamps in said row, means operative on initiation of a call by one of said lines for rendering conductive the lamp associated with the initiating line, conduction of said lamp causing the transistor individual to the column of said conducting lamp to be rendered effective to identify the final digit of the identifying number associated with said conducting lamp, and causing the transistor individual to the row of said conducting lamp to be rendered effective to identify the next final digit of the identifying number of said conducting lamp.

7. In a telephone system including a plurality of lines, each of said lines having a multi-digit identifying number individual thereto, said lines arranged in a plurality of hundred groups in accordance with the multi-digit numbers thereof, electronic means individual to each of said lines correspondingly arranged in a plurality of hundreds groups, the electronic means of each hundreds group arranged in a square matrix of columns and rows in accordance with the digits of the identifying numbers, a plurality of transistors, the electronic means in each column commonly connected to one of said transistors, each said transistor so connected individual to and representing the units digit of the multi-digit number of the electronic means in the columns, the plurality of electronic means in each row commonly connected to a transistor individual to that row representing the common tens digit of the lamps in the row, a plurality of marking transistors, means connecting each column and row transistor in corresponding columns and rows in all hundreds groups to particular marking transistors to represent the particular digit of the multi-digit designation of each of said lines represented by the particular column or row respectively, said marking transistors normally maintained in a conductive state, each of said marking transistors thereby maintaining said column and row transistors to which they are connected in a non-conductive state.

8. In a telephone system including a plurality of lines, each having a plural digit identifying number individual thereto, said lines arranged in a plurality of hundreds groups, the lines in each group arrayed in a plurality of columns and rows, a plural digit register comprising an electronic lamp individual to each line, means for rendering one lamp conductive on initiation of a call by the line individual to said lamp, a plurality of group transistors, means commonly connecting one of said group transistors to each column, said group column transistors each representing the units digit of the identifying numbers, means commonly connecting one of said group transistors to each of said rows, each said row group transistor representing the tens digit of the identifying numbers, a plurality of marking transistors, the group columns transistors in each hundreds group representing the same digit being connected commonly to a units marking transistor, the group row transistors in each hundred group representing the same digit being connected commonly to a tens marking transistor, one of said units marking and one of said tens marking transistors rendered effective upon conduction of the electronic lamp common to both the column connected to said units marking transistor and the row connected to said tens marking transistor to register the units and tens digit of the plural digit identifying number of the initiating line.

9. In a telephone system including a plurality of lines, each having a multi-digit identifying number individual thereto, and arranged in a plurality of hundreds groups in accordance with the multi-digit numbers thereof, electronic means individual to each of said lines correspondingly arranged in a plurality of hundreds groups, the electronic means of each group arranged in a square matrix of columns and rows in accordance with the digits of the identifying numbers, a plurality of transistors, the electronic means in each column commonly connected to one of said transistors, each transistor so connected being individual to and representing the units digit of said multi-digit identifying number, the plurality of electronic means in each row commonly connected to a transistor individual to that row and representing the tens digit of the multi-digit identifying number, the hundreds groups of electronic means arranged in a ten square matrix comprising group columns and rows, a plurality of marking transistors, the hundreds groups in each group column commonly controlling one of said marking transistors, each of said transistors so connected individual to and representing the thousands digit of all electronic means within hundreds groups commoned in said group column, the hundreds groups in each group row commonly controlling another of said marking transistors, each of said transistors so connected individual to and representing the hundreds digits of all electronic means in hundreds groups commonly connected in said group row.

10. In a line identification and registration circuit for a telephone system including a plurality of lines, each having an electronic lamp individual thereto, each of said lines and its associated lamp having a multi-digit identifying number individual thereto, said lines and lamps arranged in a plurality of hundreds groups, and the lamps within each of said hundreds groups arranged in a ten square matrix of columns and rows, each of the lamps in a column having the same units identifying digit, each of the lamps in a row having the same tens identifying digit, each of the lamps in a hundreds group having the same hundreds and thousands identifying digits, a plurality of units and tens transistors for each hundreds group, each of said transistors having an emitter, a collector and a base, means connecting each lamp in a column to the base of a single one of said units transistors representing the units digit of that column, means connecting each lamp in a row to the base of a single one of said tens transistors representing the digit of that row, a plurality of units marking transistors, each connected to the emitters of units transistors representing the same units digits within each of the hundreds groups, a plurality of tens marking transistors, each connected to the emitters of tens transistors representing the same tens digits within each of the hundreds groups, a plurality of hundreds marking transistors, a common multiple connecting the collectors of units transistors associated with each hundreds group, each of said hundreds marking transistors connected to the common multiples from hundreds groups having the same hundreds digits, a plurality of thousands marking transistors, a common multiple connecting the collectors of tens transistors associated with each hundreds group, each of said thousands marking transistors connected to the common multiples from hundreds groups having the same thousands digit.

11. In a telephone system including a plurality of lines, each having a multi-digit identifying number individual thereto, said lines arranged in a plurality of hundreds groups, in accordance with the multi-digit numbers thereof, electronic means individual to each of said lines correspondingly arranged in a plurality of hundreds groups, the electronic means of each group arranged in a square matrix of columns and rows in accordance with the digits of the identifying numbers, a plurality of transistors, the plurality of electronic means in each column commonly connected to one of said transistors, each transistor so connected being individual to and representing the units digit of said multi-digit identifying number, the plurality of electronic means in each row commonly connected to a transistor individual to that row and representing the common tens digit of the multi-digit identifying number, all of said hundreds groups arranged in a square matrix of columns and rows, a plurality of transistors, the hundreds groups in each group column commonly connected to a transistor, each of said transistors so connected representing the thousands digit of all lamps within hundreds groups common in said column, the hundreds groups in each row commonly connected to one of said transistors, each of said transistors so connected representing the hundreds digits of all lamps in hundreds groups commonly connected in said row, means rendering one of said electronic means effective on indication that the line associated with said electronic means is to be identified, thereby causing the units transistor and tens transistor individual respectively to the column and row of the conducting electronic means to be rendered effective to indicate the units and tens digit, and further sending an indication to the hundreds and the thousands transistors connected to the conducting electronic means, thus indicating the multi-digit identifying number of the conducting electronic means and its associated line.

12. A line identification circuit for a telephone system having a plurality of subscribers' lines, each of said lines identified by a multi-digit designation, electronic means individual to each of said lines, one of said individual electronic means rendered conductive upon indication that the line individual to said electronic means is to be identified, a plural digit register comprising a pair of primary transistors, each of said primary transistors having a base, a collector and an emitter, said conductive electronic means connected to impress an indication on the base of said pair of transistors thereupon rendering said transistors conductive, a pair of secondary transistors for each of said primary transistors, one of said pair of secondary transistors in the collector circuit of each of said primary transistors, the other of said pair of secondary transistors in the emitter circuit of each of said primary transistors, the emitter circuit transistors normally biased conductive, each collector circuit transistor rendered conductive on conduction of said primary transistors, and each emitter circuit transistor rendered non-conductive, thereby sending forth from each of the four secondary transistors so connected an indication of the multi-digit representation of the line being identified.

13. In a line identification and registration circuit for a multi-exchange telephone system having a plurality of subscribers' lines, each having a multi-digit identifying number individual thereto, the first portion of said identifying number being common for all the lines within a single exchange, the lines within each exchange arranged in a plurality of hundreds groups, the lines in each hundreds group arranged in a square matrix of columns and rows, the final four digit portion of the identifying number locating the position of the line within the exchange, the first two digits of said final portion common to all lines within a hundreds group, the third digit of said final portion being common to all lines in the same row within each of said hundreds groups, the fourth digit being common to all lines in the same column within each of said hundreds groups of the exchange, a plural digit register for the final four digit portion of said identifying number comprising, an electronic lamp individual to each line and representing the multi-digit identifying number of that line, a plurality of group transistors, means commonly connecting the lamps associated with the lines in each of said columns to one of said group transistors, means commonly connecting the lamps in each row to one of said group transistors, a plurality of marking transistors, one of said marking transistors connected to each of said column group transistors in a hundreds group and further connected in multiple to the column group transistors in all the other hundreds groups which columns transistors represent the same fourth digit of the said four digit portion of the identifying number, a marking transistor connected to each of said row transistors in a hundreds group and connected to the row transistors in all the other hundreds groups which transistors represent the same third digit of the four digit portion of the identifying number, the column group transistors within each hundreds group multipled, each such multiple junctioned with the column multiple from the remaining hundreds groups having the same first digit of said four digit portion and connected to one of said marking transistors, the row group transistors within each hundreds group also multipled, each such latter multiple junctioned with the row multiple from other hundreds groups having the same second digit and connected to another of said marking transistors.

14. In a line identification and registration circuit for a multi-exchange telephone system having a plurality of subscribers' lines, each having a multi-digit identifying number individual thereto, the first portion of said identifying number being common for all the lines within a single exchange, the lines within each exchange arranged in a plurality of hundreds groups, the lines in each hundreds group arranged in a square matrix of columns and rows, the final four digit portion of the identifying number locating the position of the line within the exchange, the first two digits of said final portion common to all lines within a hundreds group, the third digit of said final portion being common to all lines in the same row within the hundreds groups, the fourth digit being common to all lines in the same column within hundreds groups of the exchange, a plural digit register for registering the final portion of said identifying number, comprising an electronic lamp individual to each line and representing the multi-digit identifying number of that line, a plurality of group transistors, means commonly connecting the lamps representing the lines in each of said columns to one of said group transistors, means commonly connecting the lamps in each row to one of said group transistors, a plurality of marking transistors, one of said marking transistors connected to each of said column transistors in a hundreds group and further connected to the column transistors in all the other hundreds group which transistors represent the same fourth digit of the final four digit portion, another of said marking transistors connected to each of said rows transistors in a hundreds group and further connected to the rows transistors of all the hundreds groups which transistors represent the same third digit of the four digit final portion of the identifying numbers, within each hundreds group all of the columns group transistors multipled, each such multiple junctioned with the column multiple from the remaining hundreds group having the same second digit to one of said marking transistors, within each hundreds group the rows group transistors multipled, each such multiple junctioned with the row multiple from other hundreds groups having the same first digit to another of said marking transistors, the lamp associated with a line rendered conductive on receipt of an indication that said line is to be registered, thereafter rendering conductive the columns group transistor and rows group transistor to which said lamp is connected, and further rendering a marking transistor for each of the four digits of said final portion effective to mark the four digit identifying portion of the number of the line to be registered.

15. In a telephone system as outlined in claim 14, in which there are a plurality of slave transistors, one of said slave transistors directly connected to each of said marking transistors, said slave transistors rendered conductive on each of said marking transistors being rendered effective to transmit the identifying number of the line to be registered.

16. In a line identification and registration circuit for a telephone system having a plurality of subscribers' lines, each of said lines having an electronic lamp and a multi-digit identifying number individual thereto, a plurality of marking conductors, each of said marking conductors representing a possible digit of the multi-digit number of the subscribers' lines, means connecting each of said conductors to all the lamps of lines in the system having that digit as a part of the line identifying number, said connecting means comprising a plurality of transistors, means connecting two of said transistors to each of said lamps, means comprising other of said plurality of transistors for connecting each of said two transistors to two of said marking conductors, said plurality of transistors responsive to the conduction of one of said lamps for placing a marking current on the marking conductors connected to the conducting lamp and its line to thereby mark the multi-digit number individual to said line.

17. In a line identification and registration circuit for a telephone system having a plurality of subscribers' lines, each of said lines having an electronic lamp and a multi-digit identifying number individual thereto, each of the digits in a number being in a separate rank of digits, a plurality of marking conductors, said conductors arranged in a plurality of groups, each of said groups representing a rank of digits of the multi-digit identifying numbers, the conductors in a group representing all the possible digits in that rank, means connecting each of said conductors to all the lamps which have the same digit in the same rank of digits represented by that conductor, said connecting means comprising a plurality of group transistors, marking transistors and slave transistors, each of said marking conductors having a slave and a marking transistor individual thereto, means connecting each of said subscribers' lines to two of said group transistors, each of said group transistors connected to a plurality of marking and slave transistors, means causing one of said lamps to be rendered conductive on a signal that the line to which said lamp is connected is initiating a call, conduction of said lamp causing a marking current to be transmitted to the marking conductors representing the digits of the multi-digit number of the initiating line.

References Cited in the file of this patent

UNITED STATES PATENTS

| | | |
|---|---|---|
| 2,387,897 | Grandstaff | Oct. 30, 1945 |
| 2,694,753 | Den Hertog | Nov. 16, 1954 |
| 2,749,387 | Barlow | June 5, 1956 |